July 30, 1968   I. O. FIELDGATE   3,395,247
READING MACHINE FOR THE BLIND
Filed April 13, 1965   4 Sheets-Sheet 1

TO OR GATES

INVENTOR
IVAN O. FIELDGATE
BY
Douglas M. Clarkson
ATTORNEY

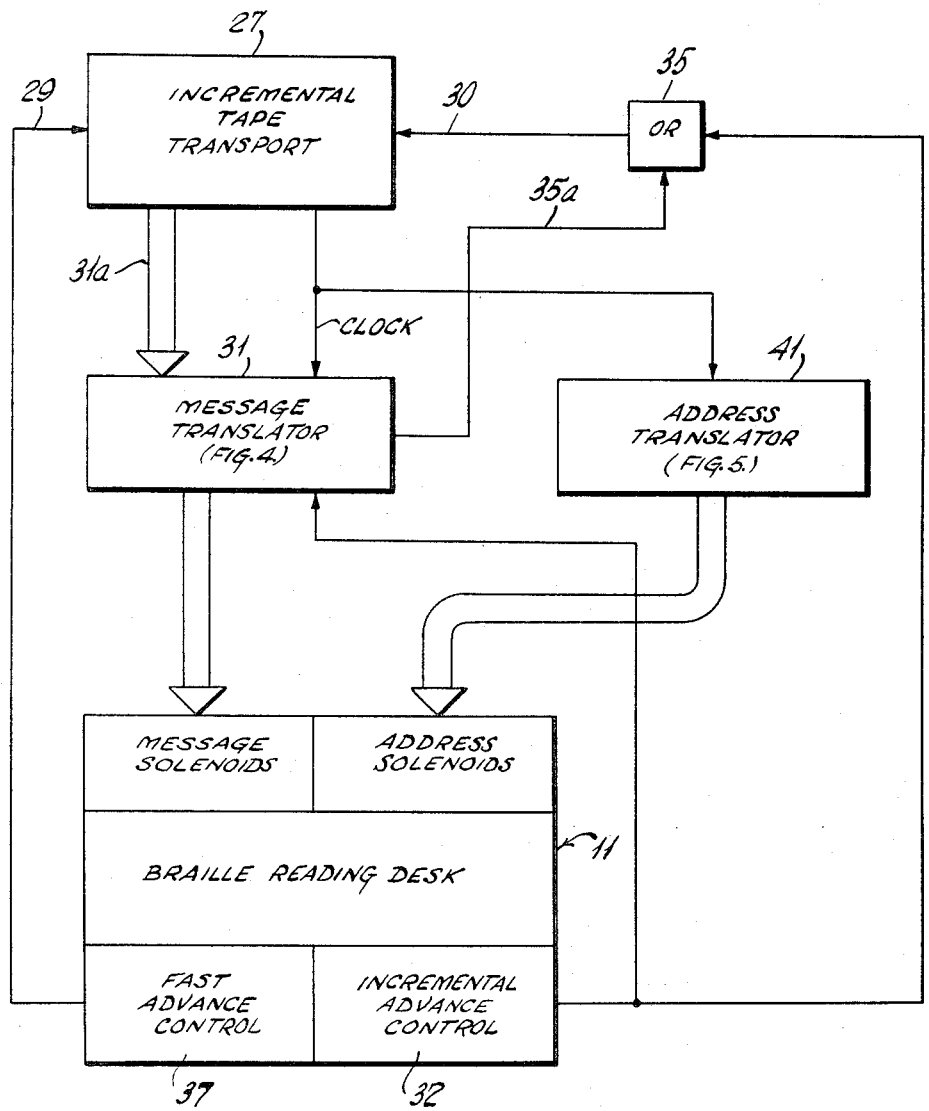

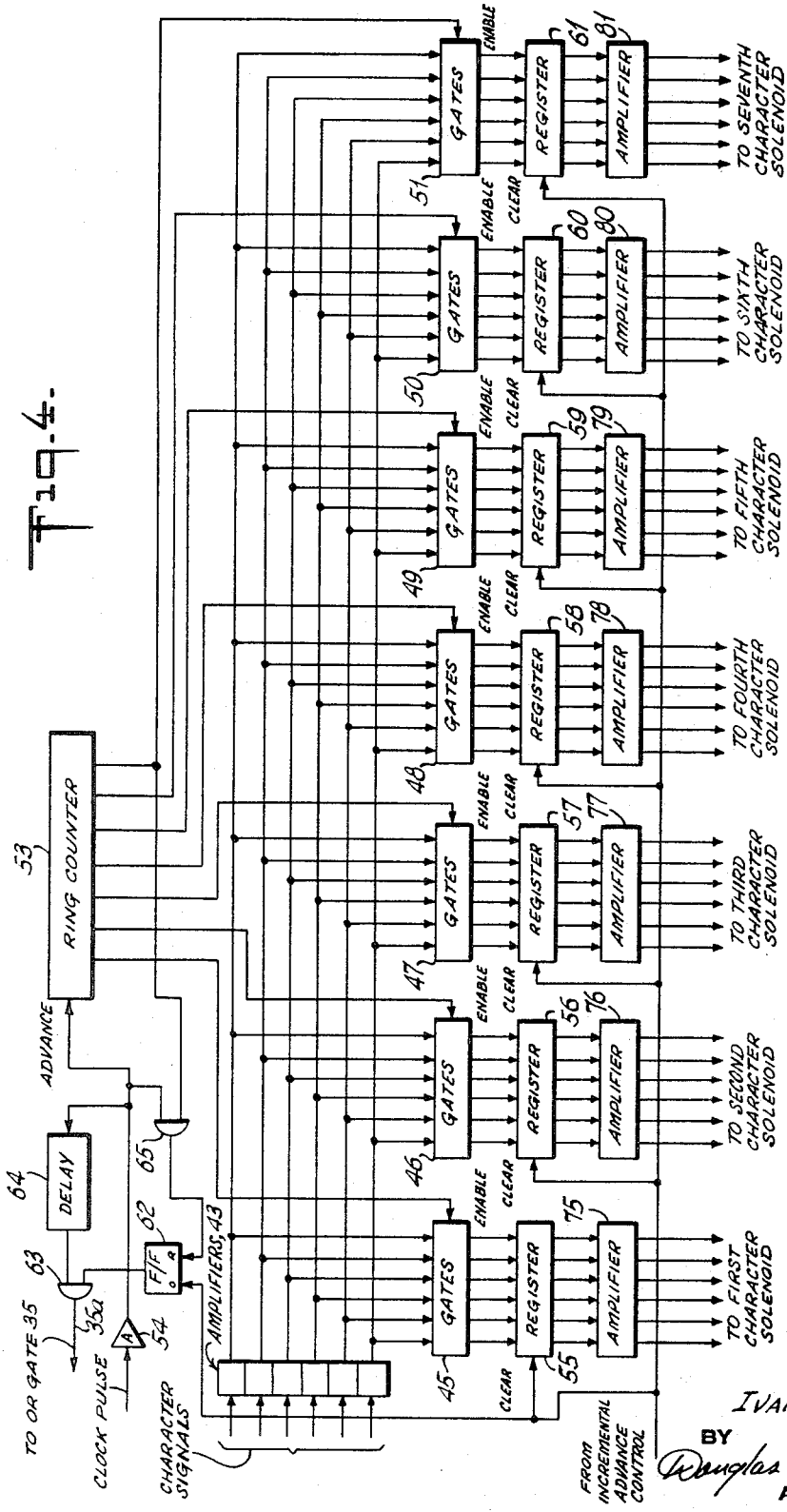

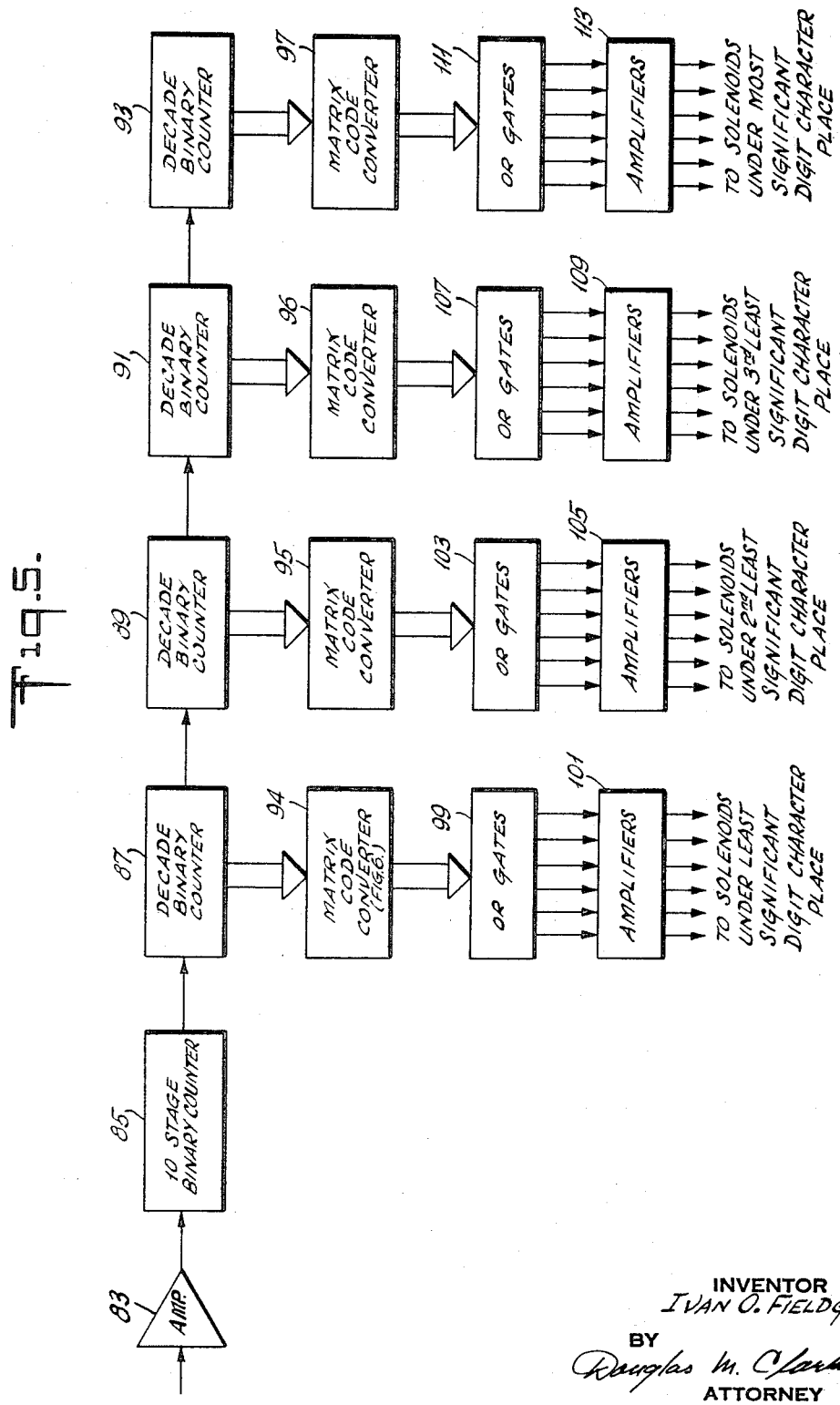

United States Patent Office 3,395,247
Patented July 30, 1968

3,395,247
READING MACHINE FOR THE BLIND
Ivan O. Fieldgate, Halesite, N.Y., assignor to Potter Instrument Company, Inc., Plainview, N.Y., a corporation of New York
Filed Apr. 13, 1965, Ser. No. 447,843
5 Claims. (Cl. 178—17)

This invention, generally, relates to a reading apparatus for the blind and, more particularly, to a system wherein signals are stored on tape and are read out and converted into tactual symbols, such as braille.

In braille, characters are represented by the presence and absence of dot projections in six positions, arranged as the six dots on the face of a die. By touching these dot projections with his fingertips, a blind person can recognize the characters represented by the dot projections and read the information represented by the braille characters.

A book printed in braille takes up about fifty times as much space as a conventional book. Because of the expense involved and the tremendous amount of space that braille publications require, only a limited number of books are printed in braille. The present invention makes it possible to make available to the blind vast amounts of printed material, such as books and newspapers, while requiring only a small fraction of the space that would be required by the material when printed in the ordinary manner to be read visually.

In accordance with the present invention, codes representing the braille characters are recorded on a tape. This recording can be done quite simply with a six-bit binary code since each braille character is represented by the presence or absence of raised dots in six possible positions. The tape is read out intermittently to a translator, which controls an output device for producing the characters in braille. The output device is in the form of a fingerboard on which the reader places his fingers.

The fingerboard is divided into a plurality of characters, and under each character are six actuators for selectively projecting six pins through the fingerboard. The pins are located in accordance with the six dot positions of the conventional braille system characters. By selectively energizing the actuators under each character, any desired message in braille can be produced on the fingerboard.

The translator selectively energizes the actuators under the fingerboard in accordance with the code read out from the tape to produce in braille a message recorded on the tape. The tape is read out from an incremental tape transport, and under the control of the reader, the tape is advanced incrementally to produce new sets of characters on the fingerboard. In this manner, publications of any length may be reproduced in braille and read from the fingerboard of the apparatus of the present invention.

Accordingly, an object of the present invention is to provide an apparatus to make printed matter readily available as tactual symbols to be read by the blind.

A further object of the present invention is to provide an apparatus to make printed matter readily available in braille.

A still further object of the present invention is to provide an apparatus which will make printed matter available in braille without requiring the vast amount of space and material which would normally be required if it were printed in braille in the conventional manner.

Another object of the present invention is to make it practical for a much greater amount of printed matter to be made available in braille.

Still another object of the present invention is to provide an apparatus in which codes representing braille characters are recorded on a tape and which reads out the recorded signals and converts the signals to braille characters.

Further objects and advantages of the present invention will become readily apparent as the following detailed description of a presently preferred form of the invention unfolds and when taken in conjunction with the accompanying drawings, wherein:

FIG. 1 is a perspective view of a braille reading desk in accordance with the present invention;

FIG. 2 schematically illustrates the operation of a solenoid actuator used to produce a braille character;

FIG. 3 is a block diagram illustrating interconnected component parts in accordance with the principles of the invention;

FIGS. 4 and 5 are detailed block diagrams of translators used in the present invention.

Figure 1:
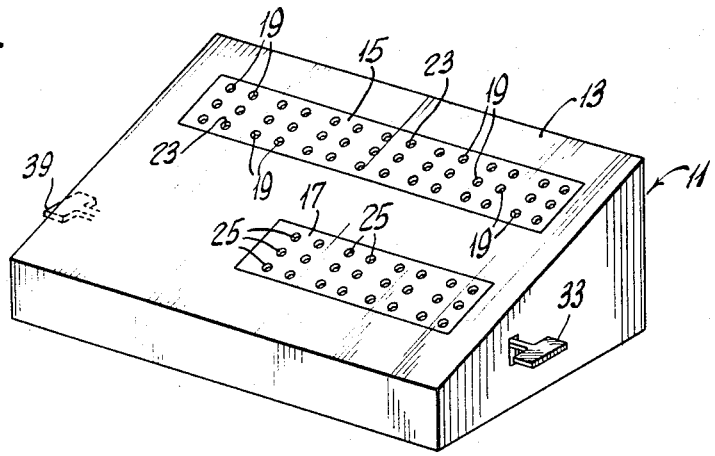

Referring now to FIG. 1, a braille output device of the reading machine of the present invention includes a reading desk 11 having an inclined top 13 in which two braille fingerboards 15 and 17 are mounted. The fingerboard 15 is for reproducing in braille the information that is recorded on a tape, and the fingerboard 17 is for producing in braille an indication of the address of the information currently being read or ready to be read from the tape.

Accordingly, the fingerboard 15 is referred to as the message fingerboard, and the fingerboard 17 is referred to as the address fingerboard. The fingerboard 15 is divided into seven character places each of which is defined by six holes 19 in the fingerboard. The six holes of each character are arranged in two vertical rows side by side as the six dots on the face of a die are arranged to produce the six possible positions for a raised dot in a braille character.

Figure 2:
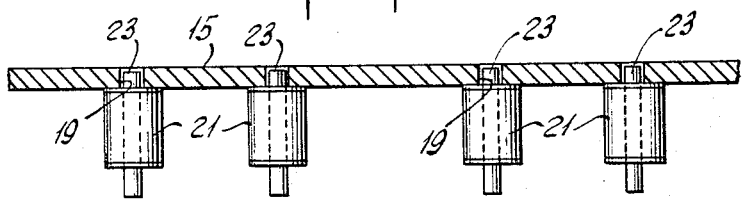

As illustrated in FIG. 2, a miniature solenoid 21 is mounted under each of the holes 19. Thus, there are six solenoids under each character place in the fingerboard 15. When one of the solenoids 21 is energized, it will project a pin 23 through its associated hole 19 which is above it, and a raised dot will be produced at the position of that hole in the character place.

Accordingly, by selectively energizing different combinations of the six solenoids under a character place, different combinations of pins may be projected up through the holes of a character place, and thus, any desired braille character can be produced in each character place. The solenoid pins are formed with flat tops and when the solenoids are not energized the tops of the pins will be flush with the top of the fingerboard so that a blind person reading the character will tactually sense only the raised pins.

Since any braille character can be produced at each character position, any seven character braille message can be produced on the fingerboard 15. Of course, the character length of the fingerboard can be varied within the scope of the invention as desired. By selectively energizing different selected combinations of solenoids in sequence, a braille message of any length can be produced on the fingerboard 15.

In FIG. 1 again, the fingerboard 17 is divided into four character places, each defined by six holes 25 arranged in the braille formation similar to the manner in which the holes 19 are arranged in the fingerboard 15. Under each of the holes there is provided a solenoid identical to the solenoids 21 and operable when energized to project its pin up through its associated hole 25. Thus, by selectively energizing the solenoids under the fingerboard 17, any four character braille message may be produced in the fingerboard 17.

The fingerboard 17, as stated previously, is used for producing the address of the information currently being read out from the tape or ready to be read out from the tape. Accordingly, the braille message produced on the fingerboard 17 normally will indicate where on the tape the information is being read out in a manner similar to the way page numbers are used in a conventional book.

In accordance with the preferred form of the invention, the braille characters are recorded in binary form on magnetic tape, although punched tape could be used, of course, and are read out from the tape and reproduced in braille on the fingerboard 15. Each braille character is represented by a six-bit binary character with each bit representing a different dot position of the character.

A "1" in the binary character, for example, will represent a raised dot in the corresponding dot position of a braille character, and a "0" in the binary character will represent the absence of a raised dot in the corresponding position of a braille character. Thus, any braille character can be represented by a six-bit binary character.

The six-bit binary characters are recorded in parallel on magnetic tape, and the magnetic tape is mounted on a conventional incremental tape transport which, in the block diagram of FIG. 3, is designated by the reference number 27. The incremental tape transport 27 may, for example, be of the type manufactured by Potter Instrument Company, Inc. and identified by the model number MT–SW. The tape transport will either advance the tape continuously in response to an input control signal applied to an input terminal 29 or will advance only one increment in response to each pulse applied to an input terminal 30. Each time the incremental tape transport advances the tape one increment, one binary character is read out.

As shown in FIG. 3, the six-bit binary characters are read out in sequence from the magnetic tape on the tape transport 27 to a message translator 31, which, in response to the received code, energizes the proper ones of the solenoids 21 to reproduce in braille the charcters represented by the code. The reading out of the binary characters from the magnetic tape is initiated by the reader from the reading desk 11 by means of an incremental advance control 32, which is actuated by a lever 33, FIG. 1, on the right-hand side of the reading desk 11. When the lever 33 is depressed, the incremental advance control 32, FIG. 3, applies a pulse through an OR gate 35 to the input terminal 30 of the tape transport 27 causing the tape transport to advance one increment and read out a six-bit binary character from the magnetic tape.

Accompanying each six-bit binary character is a clock pulse, which is applied to the translator 31 also. The translator 31, after a delay, applies a pulse through the OR gate 35 to the input terminal 30 to cause the incremental tape transport 27 to advance another increment, and the next six-bit binary character is read out. The translator 31 will continue to apply pulses through the OR gate 35 to the input terminal 30 after each character is read out until seven characters have been read out by the tape transport 27.

The translator 31 will control the solenoids under the seven character places in the fingerboard 15 in accordance with the characters read out from the incremental tape transport. The tape transport 27 will then not advance until another command is received from the reading desk 11. Each time the incremental advance control 32 applies a pulse to the input terminal 30 starting the incremental advance of the tape transport 27, it also applies a signal to the translator 31 to clear the translator 31 for the readout of the next seven characters.

The reading desk 11 is provided also with a fast advance control 37, FIG. 3, which is actuated by means of a lever 39, FIG. 1, positioned on the left side of the reading desk. When the lever 39 is depressed and for as long as the lever 39 is depressed, the fast advance control 37 will apply a signal to the input 29 of the incremental tape transport 27 which then will advance the tape continuously for as long as the control signal is applied.

The clock pulses, read out with the six-bit binary characters, are applied also to an address translator 41, FIG. 3, which controls the solenoids under the address fingerboard 17 in accordance with the number of clock pulses that have been read out. In this manner, an indication of where the information is being read out on the tape is provided.

FIG. 4 illustrates the details of the message translator 31 and shows the six-bit binary character signals as they are applied to the message translator 31 where they are amplified by a set of amplifiers 43 and, then, are applied to seven sets of gates 45–51. Each set of gates has six gates to receive the six-bit binary character signals severally. Each of the seven sets of gates 45–51 is associated with a different one of the character places in the message fingerboard 15. Considering the character place furthest on the left as the "first" or "most significant" character place and reading from left to right, the sets of gates 45–51 are associated with the first through the seventh character places, respectively.

A ring counter 53 is provided to select one of the sets of gates 45–51 to be enabled. The ring counter 53 has seven stages, each of which includes a flip-flop circuit. Such ring counters are well known in the art, and an example of such a ring counter is disclosed in a patent to John M. Hollywood, No. 2,306,386, entitled Electronic Apparatus, and issued on Dec. 29, 1942.

To facilitate the description of the operation of the ring counter, a stage of the ring counter will be considered to store a bit if the flip-flop of the stage is in a first state and will be considered to be empty if it is in the opposite state. A single bit is stored in the ring counter and is shifted from flip-flop to flip-flop in response to each applied input pulse. When the bit is in the last stage and an input pulse is applied, the bit will be shifted back to the first stage.

When the first six-bit binary character is received from the tape transport 27 over the circuit connection 31a, FIG. 3, the bit will be stored in the first stage of the ring counter 53, FIG. 4. As a result, the ring counter 53 will enable the set of gates 45, and the six-bit binary character will pass through the gates 45 and be registered in a six-stage register 55. The clock pulse accompanying the six-bit binary character, after being amplified by an amplifier 54, will be applied to the ring counter 53 to shift the bit in the ring counter 53 to the second stage.

As a result, the ring counter 53 then will enable or "set" the gates 46. When the second character is received from the tape transport 27 and is amplified by the amplifiers 43, it will therefore pass through the enabled gates 46 to be registered in the register 56.

The clock pulse accompanying the second six-bit binary character, after being amplified by an amplifier 54, FIG. 4, will be applied to the ring counter 53 to shift the bit in the ring counter 53 so that the ring counter 53 then enables the gates 47. Accordingly, the third six-bit binary character will pass through the gates 47 to be registered in a register 57. The clock pulse accompanying the third character will shift the bit in the ring counter to the fourth stage, which then will enable the gates 48 so that the fourth binary character will pass through the gates 48 to be registered in the register 58.

In a similar manner, the ring counter 53 will enable the gates 49, 50 and 51 when the fifth, sixth and seventh characters, respectively, are received. The fifth, sixth and seventh characters will pass through the gates 49, 50 and 51 to be registered in the registers 59, 60 and 61, respectively. The clock pulse accompanying the seventh character will cause the bit to shift from the seventh stage of the ring counter 53 back to the first stage.

When a pulse is applied from the incremental advance 32, FIG. 3, through the OR gate 35 to the input 30 of the incremental tape transport 27 causing the first six-bit binary character to be read out, the incremental advance control 32 also applies a pulse to the message translator 31. This pulse is applied also to all of the registers 55–61, FIG. 4, to clear these registers and is applied also to a flip-flop circuit 62 to set the flip-flop.

The flip-flop 62, upon being set, will enable a gate 63. Each clock pulse accompanying the six-bit binary characters after being amplified by the amplifier 54 is applied through a delay line 64 to the gate 63. The clock pulse accompanying the first character to be read out in response to the pulse produced by the incremental advance control 32 will pass through the gate 63 as a result of the gate 63 being enabled by the flip-flop 62. Upon passing through the gate 63, the clock pulse then will pass through the OR gate 35 to the input 30 of the incremental tape transport 27. Accordingly, the incremental tape transport 27 then will read out the second six-bit binary character.

The clock pulse accompanying the second character will also pass through the gate 63 to cause the reading out of the third character. Similarly, the clock pulses accompanying the third, fourth, fifth and sixth characters also will pass through the gate 63 to cause the tape transport 27 to read out the fourth, fifth, sixth and seventh characters.

When the bit in the ring counter 53 has been shifted to the seventh stage, the ring counter 53 will enable a gate 65, FIG. 4. Each of the clock pulses passing through the amplifier 54 will also be applied to the gate 65, but only the clock pulse accompanying the seventh character to be read out after the advance control 32 has been caused to produce an output pulse will pass through the gate 65 since the gate 65 will be enabled only when a bit is stored in the seventh stage of the ring counter 53.

The pulse accompanying the seventh character will pass through the gate 65 and will reset the flip-flop 62. As a result, the gate 63 will no longer be enabled, and the clock pulse accompanying the seventh character, after passing through a delay line 64, will not pass through the gate 63. Accordingly, the incremental tape transport 27 will not read out an additional character, and thus, the incremental tape transport 27 reads out just seven characters when the incremental advance control 32 is caused to produce an output pulse by the depression of the control lever 33 on the reading desk 11.

After the first six-bit binary character has been stored in the register 55, those stages of the register 55 which store "ones" will produce output signals, which will be amplified by a set of amplifiers 75 and then will energize the corresponding solenoids under the first character place of the message fingerboard 15 in FIGS. 1 and 2. Thus, the first six-bit binary character readout by the incremental tape transport, after the incremental advance control 32 is caused to produce an output pulse, will be produced in braille in the first character place on the message fingerboard.

Similarly, the stages of the register 56 which store "ones" will produce output signals, which will be amplified by a set of amplifiers 76 and then will energize the corresponding solenoids under the second character place of the message fingerboard 15 to produce in braille in the second character place the second character read out after the advance control 32 produces an output pulse. Likewise, the output signals of the registers 57–61 from stages storing "ones" will be amplified by the amplifiers 77–81, respectively, and will energize the proper solenoids under the third through seventh character places of the message fingerboard 14 to produce in baille the third through seventh characters read out after the advance control 32 has been caused to produce an output pulse.

In this manner, the first seven characters that are read out from the tape transport 27 are produced in braille on the message fingerboard 15 in the proper order in response to the depression of the lever 33. When the lever 33 is depressed again, the next set of characters will be produced in braille on the fingerboard 15 in the same manner. Thus, by operating the lever 33 a blind person can read in braille the entire message stored on the magnetic tape.

FIG. 5 illustrates the details of the address translator 41. In the address translator 41, the clock pulses first are amplified by an amplifier 83 and, then, are applied to a ten-stage binary counter 85, which functions as a frequency divider producing one output pulse for each 1,024 applied input pulses. The output pulses produced by the binary counter 85 are applied to a decade binary counter 87. Each time the decade binary counter 87 recycles to 0, it applies a pulse to a decade binary counter 89. Each time the decade binary counter 89 recycles to 0, it applies a pulse to a decade binary counter 91 which, in turn, upon recycling to 0 applies a pulse to a decade binary counter 93.

While the decade binary counters 87, 89, 91 and 93 may be any suitable type, the type disclosed in a patent to Howard C. Lawrence, Jr., and Robert R. Frease, Jr., No. 2,542,685, entitled Electric Counter, and issued on Feb. 20, 1951, is used herein. Utilizing the teachings in the Lawrence and Frease patent, the decade counters 87, 89, 91 and 93, FIG. 5, recycle to "zero" upon reaching a count of ten and, thus, produce one output pulse for every ten input pulses.

Accordingly, the counter registered by the counter 89 will increase by one for every 10 output pulses of the binary counter 85, the count registered by the counter 91 will increase by one for every 100 output pulses of the binary counter 85, and the count registered by the counter 93 will increase by one for every 1000 output pulses produced by the binary counter 85. Thus, the counts registered by the counters 87, 89, 91 and 93 will correspond to the digits of a four digit decimal number equal to the number of pulses produced by the binary counter 85.

Since the number of pulses produced by the counter 85 represents the number of clock pulses read out from the tape transport divided by 1024, the decimal number represented in the counters 87, 89, 91 and 93 will represent the address on the magnetic tape of the information currently being read out or ready to be read out.

The decade counters 87, 89, 91, and 93 apply signals to matrix code converters 94–97 representing the counts registered therein. Each of the matrix code converters has ten output signal lines and produces a positive output signal voltage on the one of the ten ouput signal lines corresponding to the count registered in the decade binary counter from which it receives signals.

The ten output lines of the matrix code converter 94 are connected to a set of six OR gates 99, and in addition, each output line from the matrix code converter 94 is connected to inputs of a different combination of the OR gates 99. The combination of OR gates 99 to which each of the output lines of the converter 94 is connected is selected so that the braille character produced will correspond to the number registered in the decade binary counter 87. The outputs from the OR gates 99 are amplified by a set of amplifiers 101 and, then, applied severally to the solenoids under the least significant digit character place, which is the character place the furthest to the right in the address fingerboard 17 in FIG. 1.

Thus, one of the ten outputs of the matrix code converter 94 will have a positive signal voltage applied thereto corresponding to the count registered by the decade binary counter 87. This signal will pass through a combination of the OR gates 99 and will be amplified by the amplifiers 101 before being applied to a predetermined combination of the solenoids under the least significant digit character place of the fingerboard 17. Thus, a braille character will be produced in this character place.

A set of six OR gates 103 are connected to receive the output lines of the next matrix code converter 94, FIG. 5. The outputs of the OR gates 103 are connected to be amplified by a set of amplifiers 105 and applied to the solenoids under the second least significant digit character place in the address fingerboard 17.

The output lines of the matrix code converter 96 are connected to different combinations of six OR gates 107, the outputs of which are connected to be amplified by a set of amplifiers 109 and applied to solenoids of the third least significant digit character place in the address fingerboard 17. Similarly, the output lines of the matrix code converter 97 are connected to different combinations of OR gates 111, the outputs of which are connected to be amplified by a set of amplifiers 113 and applied to the solenoids under the most significant digit character place in the fingerboard 17.

The second least significant digit character place is naturally the second character place from the right in the fingerboard. Similarly, the third least signficant digit character place is the third character place from the right, and the most significant digit place is the character place on the left.

The matrix code converter 95, FIG. 5, together with the OR gates 103 and the amplifiers 105 control the energization of solenoids under the second least significant digit character place in the address fingerboard 17, FIG. 1, to produce in braille the number registered in the decade binary counter 89 in the same manner that the matrix code converter 94 together with the OR gates 99 and the amplifiers 101 control the energization of the solenoids under the least significant digit character place. Similarly, the solenoids in the third least significant digit character place are controlled by the matrix code converter 96 in combination with the OR gates 107 and the amplifiers 109 to produce in braille the number registered in the decade binary counter 91, and the solenoids under the most significant digit character place are controlled by the matrix code converter 97 in combination with the OR gates 111 and the amplifiers 113 to produce in braille the number registered in the decade binary counter 93.

In this manner, a number will be produced in braille in the address fingerboard 17 which number is equal to the decimal number represented by the numbers registered in the counters 87, 89, 91 and 93. Accordingly, a number will be produced in braille in the address fingerboard 17 which is representative of the position on the magnetic tape that is currently being read out or that is ready to be read out.

Figure 6:
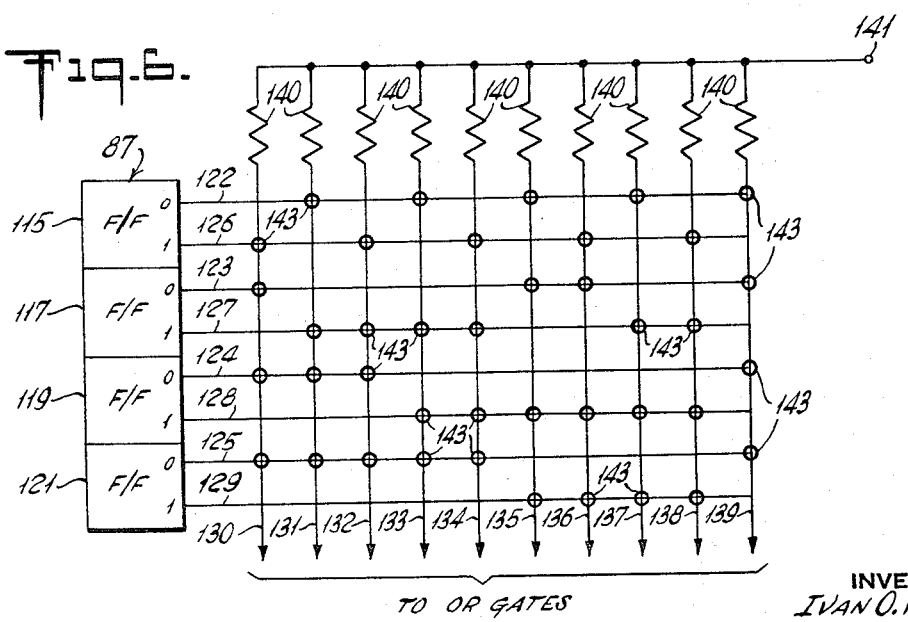
FIG. 6 is a circuit diagram of a selector matrix used in the present invention.

The selection matrices 94, 95, 96 and 97 are conventional diode selection matrices well known in the art. FIG. 6 illustrates a typical matrix code converter, such as the matrix 94 and illustrates how it operates to provide a positive output signal voltage on one of its ten output lines corresponding to the count registered in the decade binary counter 87. The matrices 95, 96 and 97, of course, have circuits identical to the matrix 94.

As shown in FIG. 6, the decade binary counter 87 has four flip-flops 115, 117, 119 and 121. When the count registered in the binary counter 87 is 0, all of the flip-flops 115, 117, 119 and 121 will be in their 0 states. As is disclosed in the above-mentioned Lawrence and Frease Patent No. 2,542,685, the states of the flip-flops will change according to the following table in response to each successive pulse to register the counts 1–9.

| Pulse Number and Count Registered | State of Flip-Flops in Fig. 6 | | | |
|---|---|---|---|---|
| | Flip-Flop 115 | Flip-Flop 117 | Flip-Flop 119 | Flip-Flop 121 |
| 1 | 1 | 0 | 0 | 0 |
| 2 | 0 | 1 | 0 | 0 |
| 3 | 1 | 1 | 0 | 0 |
| 4 | 0 | 1 | 1 | 0 |
| 5 | 1 | 1 | 1 | 0 |
| 6 | 0 | 0 | 1 | 1 |
| 7 | 1 | 0 | 1 | 1 |
| 8 | 0 | 1 | 1 | 1 |
| 9 | 1 | 1 | 1 | 1 |

In the table, the pulses are numbered in the order in which they are applied to the decade counter 87 with the decade counter starting with all of its flip-flops in their "zero" states. As indicated in the legend of the table, the column on the left represents both the pulse numbers and the count registered by the counter. The columns on the right indicate the states that the flip-flops assume after each applied pulse and also to register a given count. The tenth pulse received will cause all of the flip-flops to be set back to their "zero" states to register a count of zero and the counter will produce an output pulse.

A set of conductors 122 through 125 are connected to the 0 outputs of the flip-flops 115, 117, 119 and 121, respectively, and a set of conductors 126 through 129 are connected to the 1 outputs of each of the flip-flops 115, 117, 119 and 121, respectively. Whenever any one of the flip-flops is in its 0 state, it will apply a plus voltage to the conductor connected to its 0 output, and whenever any one of the flip-flops is in its 1 state, it will apply a plus voltage to the conductor connected to its 1 output.

The conductors 122 through 129 are arranged in parallel and are crossed by ten additional parallel conductors 130 through 139, which are the output conductors of the matrix. Each of the conductors 130 through 139 is connected through a resistor 140 to a source of positive electrical potential applied at a terminal 141.

The conductors 122 through 129 are connected at intersections by means of diodes 143 to different combinations of the output conductors 130–139. The diodes 143 are represented in FIG. 6 by a circle at the intersection of the conductors 122–129 with the conductors 130–139 and have the appropriate electrical polarity so that current will flow from the conductors 130–139 to the conductors 122–129.

Accordingly, if all the conductors to which one of the output conductors 130–139 is connected by means of the diodes 143 have a positive polarity voltage applied thereto by the flip-flops of the decade counter 87, then this conductor will rise to a relatively high positive voltage. However, if one or more of the conductors 122–129 to which a given one of the output conductors 130–139 is connected is at a low potential, then this output conductor will remain at a low potential because of the voltage drop that will occur across the resistor 140.

For example, when the decade counter 87 registers a 0 and all of the flip-flops 115, 117, 119 and 121 are in their 0 states, all of the conductors 122–125 will have a positive potential applied thereto. As a result, the conductor 139 will rise to a high potential and all the remaining output conductors 130–138 will remain at a low potential.

The diodes 143 are arranged so that each of the ten possible counts which can be registered in the decade binary counter 87 will cause a different one of the output conductors 130–139 to rise to a high potential. Thus, when the counter registers a count of "one" and the flip-flop 115 is in its 1 state and the remaining flip-flops 117, 119 and 121 are in their 0 states as indicated in the table, the conductor 130 will rise to a high potential. When the counter registers a count of "two" and the flip-flop 117 is in its 1 state and the remaining flip-flops 115, 119 and 121 are in their 0 states, the conductor 131 will rise to a high potential.

The relatively high output voltage on one of the output conductors 130–139 is passed through the proper ones of the OR gates 99 and is amplified by corresponding amplifiers 101 to energize the proper solenoids under the least significant digit character place in the address fingerboard 17 to produce in braille the number registered in the decade counter 87. The remaining matrices 95, 96 and 97 operate in the same manner to produce in braille the numbers registered in the decade counters 89, 91 and 93.

The above describes the development of braille outputs under the control of binary signals recorded on magnetic tape. However, it will be understood that the system could also operate in response to other information storage systems instead of magnetic tape, such as punched tape. If punched tape were used, the pins which produce the braille characters in the reading desk 11 could be pneumatically actuated in response to pneumatic signals from the punched tape, instead of being actuated by electromagnetic solenoids. Also, tactual symbols other than braille characters could be used to represent the information to be read by the blind.

These and many other modifications may be made in the above-described specific embodiment of the invention without departing from the spirit and scope of the invention, which is defined in the appended claims.

What is claimed is:

1. A reading machine for the blind comprising in combination,
    a line of discrete character positions,
    means at each of said character positions for forming a tactile character in response to receipt of a character generating signal,
    an incremental information storage tape transport adapted to advance an information storage tape,
    means for producing a burst of character generating signals in response to a tape advance command signal,
    means for coupling the $n$th character signal of said burst to the $n$th character position of said line to form words of said characters that can be read by touch.

2. A reading machine for the blind as in claim 1 further including manually operable means for generating a tape advance signal.

3. A reading machine for the blind as in claim 2 wherein said tape is a magnetic tape.

4. A reading machine for the blind as in claim 3 including a second line of discrete tactile character forming means and means responsive to clock signals encoded on the information storage tape for energizing said second line of character forming means to form the address of said tape.

5. A reading machine as in claim 4 wherein said means for coupling the $n$th character signal to the $n$th character position includes a counter, a gate means, and a storage register.

References Cited

UNITED STATES PATENTS

| | | | |
|---|---|---|---|
| 2,549,632 | 4/1951 | Notlingham | 35—35.1 |
| 2,891,324 | 6/1959 | Zuk | 35—35.1 |
| 3,230,644 | 1/1966 | Irazoqui | 35—35.1 |

THOMAS A. ROBINSON, *Primary Examiner.*